(12) United States Patent
Gupta et al.

(10) Patent No.: US 8,412,955 B1
(45) Date of Patent: Apr. 2, 2013

(54) FRAMEWORK AND METHOD FOR SECURE DATA MANAGEMENT IN A DIVERSIFIED PLATFORM

(75) Inventors: Puneet Gupta, Bangalore (IN); Akshay Darbari, Allahabad (IN); Venkat Kumar Sivaramamurthy, Bangalore (IN)

(73) Assignee: Infosys Limited, Bangalore (IN)

( * ) Notice: Subject to any disclaimer, the term of this patent is extended or adjusted under 35 U.S.C. 154(b) by 4 days.

(21) Appl. No.: 13/327,547

(22) Filed: Dec. 15, 2011

(30) Foreign Application Priority Data

Sep. 14, 2011 (IN) .............................. 3151/CHE/2011

(51) Int. Cl.
*G06F 21/00* (2006.01)
(52) U.S. Cl. ......................................................... 713/189
(58) Field of Classification Search .................. 713/161, 713/168, 189; 726/2, 3
See application file for complete search history.

(56) References Cited

U.S. PATENT DOCUMENTS 8,095,972 B1 * 1/2012 Floyd et al. ....................... 726/9

* cited by examiner

*Primary Examiner* — Brandon Hoffman
*Assistant Examiner* — Anthony Brown
(74) *Attorney, Agent, or Firm* — Klarquist Sparkman, LLP

(57) ABSTRACT

The disclosure provides a method and a framework for secure data management, in which the method comprises: enabling, by an enterprise server, a user to download an enterprise application from the enterprise server using a computing device. User authentication credentials are provided by the enterprise server to a user when the user registers with the enterprise server. A unique client ID is assigned for the enterprise application downloaded by the computing device by the enterprise server. Keys for data encryption or decryption are generated by the enterprise server, for different services provided by the enterprise server based on a combination of the unique client ID, a user ID and/or a computing device ID.

39 Claims, 4 Drawing Sheets

FRAMEWORK AND METHOD FOR SECURE DATA MANAGEMENT IN A DIVERSIFIED PLATFORM

CROSS REFERENCE TO RELATED APPLICATIONS

This application claims the benefit of India Patent Application No. 3151/CHE/2011, filed in India on Sep. 14, 2011, which is incorporated by reference herein.

FIELD

The present disclosure relates generally to the field of data management. In particular, the present disclosure relates to secure data management in a diversified platform.

BACKGROUND

Developments in secure management of data have made a revolutionary change in services such as banking, insurance etc. Typically, data management is securely handled by following different standards for a single platform or for multiple platforms. Different platforms provide different levels of security. A few of these platforms may support secured storage of data while others may not. When an application is targeted for different platforms, different approaches are required for different platforms adding to the complexity. Further, additional complexities such as upgrading of application/handsets, using multiple devices to access, stolen handsets, and multiple user access on the same handset are not addressed.

Hence, there is a need for a unique security framework that ensures uniform level of secure data management for computing devices running on multiple platforms.

SUMMARY

The present disclosure relates to a method and a framework for secure data management. In various embodiments, the method comprises: enabling, by an enterprise server, a user to download an enterprise application from the enterprise server using a computing device. User authentication credentials are provided by the enterprise server to a user when the user registers with the enterprise server. A unique client ID is assigned for the enterprise application downloaded by the computing device by the enterprise server. Keys for data encryption or decryption are generated by the enterprise server, for different services provided by the enterprise server based on a combination of the unique client ID, a user ID and/or a computing device ID.

The method further comprises: enabling the enterprise server to provide a list of services, a first set of keys for data encryption or decryption and a first set of predefined encryption or decryption algorithms corresponding to the list of services to the computing device.

The method further comprises: enabling the computing device to launch the enterprise application and retrieve the first set of keys for data encryption or decryption and the first set of predefined encryption or decryption algorithms from the enterprise server.

The method further comprises: enabling the user to select an appropriate service from the list of the services provided by the enterprise server upon successful authentication of the user by the enterprise server, where the services may be bundled along with the enterprise application at the time of downloading the enterprise application. Data that is yet to be stored or already stored in the computing device is encrypted and/or decrypted by using at least one key from among the first set of keys and at least one encryption or decryption algorithm from among the first set of encryption or decryption algorithm corresponding to the service selected by the user.

The method further comprises: deleting the information pertaining to the keys and the predefined encryption or decryption algorithms whenever the computing device exits the enterprise application.

In various embodiments, a framework for secure data management comprises an enterprise server that is configured to enable a user to download an enterprise application from the enterprise server using a computing device, provide user authentication credentials when a user registers with the enterprise server and assign a unique client ID for the enterprise application that is downloaded by the computing device from the enterprise server.

The enterprise server generates keys for data encryption or decryption for different services provided by the enterprise server based on the unique client ID, the user ID and/or a computing device ID, provides a list of services, a first set of keys for data encryption or decryption and a first set of predefined encryption or decryption algorithms corresponding to the list of services to the computing device.

The computing device is configured to launch the enterprise application that is downloaded, and retrieve the first set of keys for encryption or decryption and the first set of predefined encryption or decryption algorithms from the enterprise server.

The user selects an appropriate service from the list of services provided by the enterprise server upon successful authentication of the user by the enterprise server using the computing device, where the services may be bundled along with the enterprise application at the time of downloading the enterprise application.

The data that is yet to be stored or already stored in the computing device is encrypted and/or decrypted by using at least one key from among the first set of keys and at least one encryption or decryption algorithm from among the first set of encryption or decryption algorithm corresponding to the service selected by the user.

The enterprise application further deletes the information pertaining to the keys and the predefined encryption or decryption algorithms whenever the computing device exits the enterprise application.

DRAWINGS

These and other features, aspects, and advantages will be better understood when the following detailed description is read with reference to the accompanying drawings in which like characters represent like parts throughout the drawings, wherein.

DETAILED DESCRIPTION

The following description is the full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to get an advantage without the corresponding use of other features described in the following paragraphs. As such, the present description should be considered as merely illustrative of the principles of the present technique and not in limitation thereof, since the present technique is defined solely by the claims.

Figure 1:
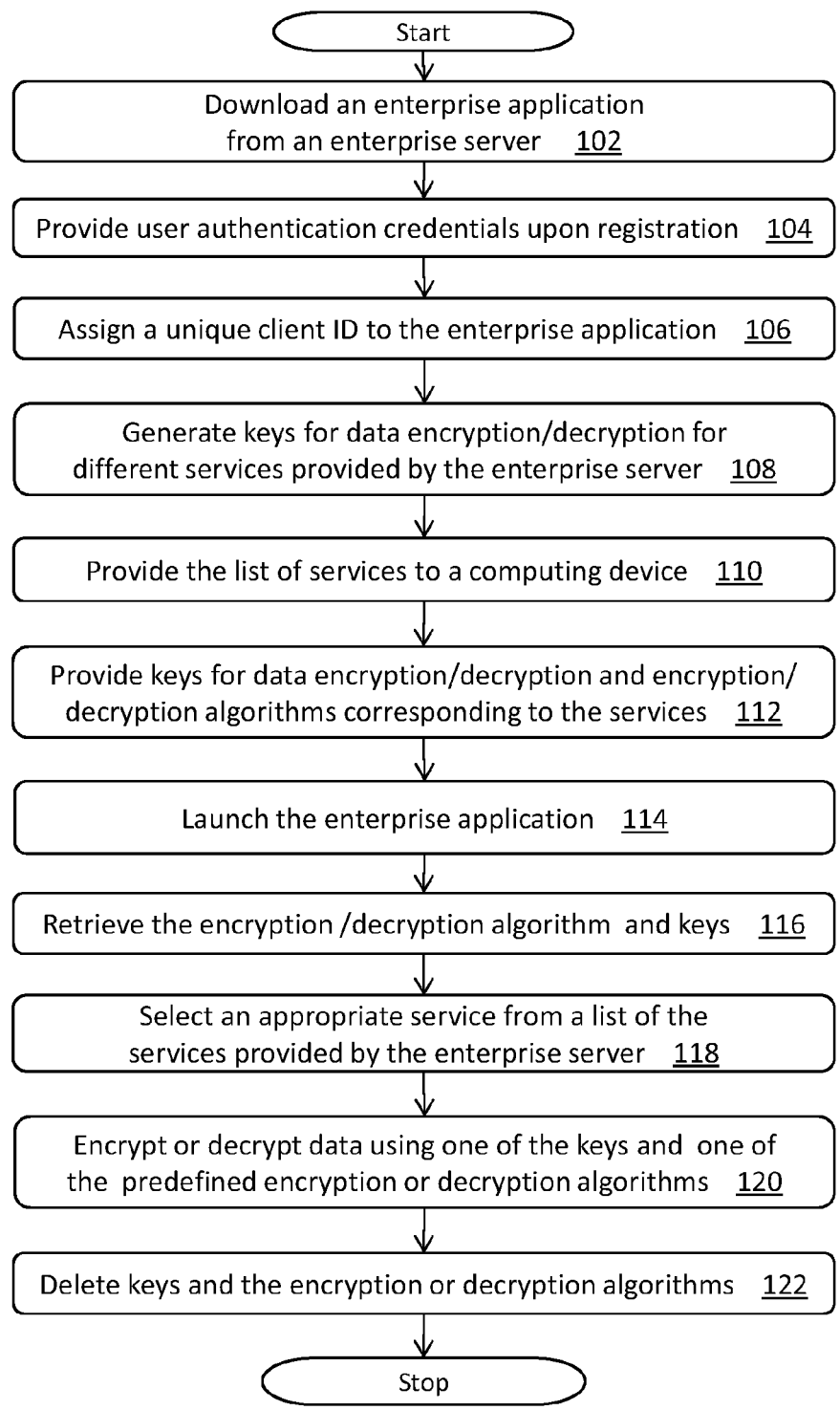
FIG. 1 shows a flow chart describing a method for secure data management, in accordance with an embodiment.

FIG. 1 shows a flow chart describing a method for secure data management, in accordance with an embodiment of the present invention. In various embodiments, a user downloads an enterprise application from the enterprise server using a first computing device at step 102. At step 104, the enterprise server provides user authentication credentials to the user when the user registers with the enterprise server. At step 106, the enterprise server assigns a unique client ID to the enterprise application that is downloaded.

At step 108, the enterprise server generates keys for data encryption or decryption for different services provided by the enterprise server based on a combination of a unique client ID, a user ID, and a computing device ID, where the computing device ID is optional.

At step 110, the enterprise server provides a list of services to the computing device. At step 112, the enterprise server provides a first set of keys for encryption or decryption and information pertaining to a first set of encryption or decryption algorithms corresponding to the list of services to the first computing device.

At step 114, the first computing device launches the enterprise application that is downloaded and at step 116, the first set of keys for encryption or decryption and the first set of encryption or decryption algorithms corresponding to the list of services are retrieved from the enterprise server by the first computing device, where the first set of keys for encryption or decryption and the information pertaining to the first set of encryption or decryption algorithms are shared via secure channel like HTTPS.

At step 118, the user selects an appropriate service from the list of services by using the first computing device.

At step 120, the data that is yet to be stored or already stored in the first computing device is encrypted or decrypted based on one of the keys from the first set of keys for encryption or decryption and by one of the algorithms from the first set of algorithms for encryption or decryption corresponding to the service selected by the user.

At step 122, the information pertaining to the keys and the predefined encryption or decryption algorithms are deleted whenever the first computing device exits the enterprise application.

It should be noted that the first computing device performs the steps 114-122 every time the enterprise application is launched in the first computing device.

Figure 2:
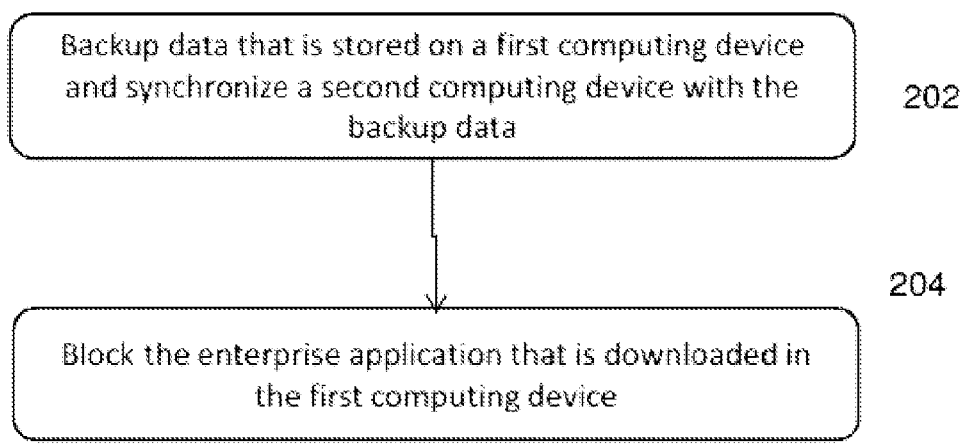
FIG. 2 shows a flow chart describing steps involved when a user notifies the utilization of a new device for accessing an enterprise application, in accordance with an embodiment.

FIG. 2 shows a flow chart describing steps involved when a user notifies the utilization of a new device for accessing an enterprise application, in accordance with an embodiment of the present invention. In various embodiments, when the user notifies the enterprise server about the utilization of a new device for accessing the enterprise application, at step 202, the enterprise server takes a backup of the data that is stored on the first computing device and synchronizes a second computing device with the backup data. At step 204, the enterprise application that is downloaded in the first computing device is blocked by the enterprise server.

Figure 3:
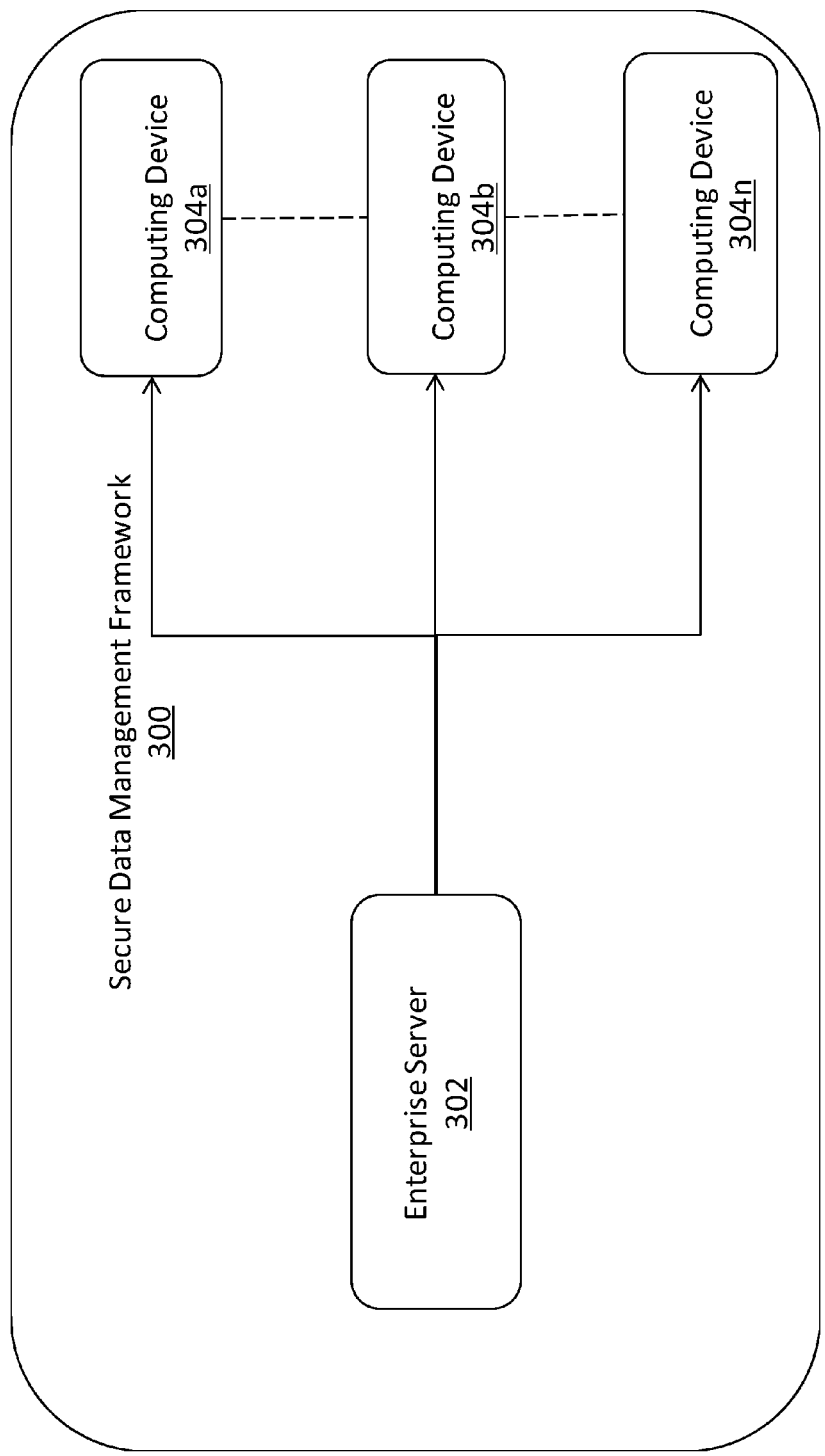
FIG. 3 is a framework 300 for secure data management, in accordance with an embodiment.

FIG. 3 is a framework 300 for secure data management, in accordance with an embodiment of the present invention. In various embodiments, framework 300 includes an enterprise server 302, which enables a user to download an enterprise application [not shown in the figure] from the enterprise server using a first computing device 304 and assign a unique client ID for the enterprise application. Enterprise server 302 also provides user authentication credentials to a user when the user registers with enterprise server 302. Enterprise server 302 generates keys for data encryption or decryption for different services provided by enterprise server 302 based on a combination of the unique client ID, the user ID and a computing device ID, where the computing device ID is optional. The unique client ID, user ID and the computing device ID could be numbers or alphabets or a combination of alphabets and numbers.

Enterprise server 302 provides a list of services, a first set of keys for data encryption or decryption and information pertaining to a first set of predefined encryption or decryption algorithms corresponding to the list of services to the first computing device 304a. Services provided by enterprise server can be a cheque book request on a banking application or employee accessing critical work information from the enterprise server.

First computing device 304a launches the enterprise application that is downloaded from enterprise server 302. First computing device 304a also retrieves the first set of keys for data encryption or decryption and the information pertaining to the first set of predefined encryption or decryption algorithms via a secure channel, such as HTTPS.

The user selects an appropriate service from the list of services provided by the enterprise server using first computing device 304a upon successful authentication of the user by the enterprise server 302. The computing device could be a mobile device, PDA, desktop, notebook, tablet, netbook, laptop, ultrabook etc. In accordance with an embodiment of the present invention, the data that is yet to be stored or already stored in first computing device 304a is encrypted or decrypted by using at least one key from among the first set of keys and at least one algorithm from among the first set of encryption or decryption algorithm corresponding to the service selected by the user.

The enterprise application that is downloaded in first computing device 304a is configured to delete information pertaining to the keys and the predefined encryption or decryption algorithms, provided by enterprise server 302 whenever the first computing device 304a exits the enterprise application.

In accordance with various embodiments, enterprise server 302 is further configured to share same or different keys for different services provided by enterprise server 302.

Similarly, enterprise server 302 may utilize the same or different predefined encryption or decryption algorithms for each service provided by enterprise server 302. In an embodiment, enterprise server 302 replaces at least one key from the first set of keys with at least one key from among a second set of keys at any instant of time and notifies about the change in the keys to the enterprise application. Enterprise server 302 provides the first set of keys and the second set of keys to the enterprise application to enable the enterprise application to decrypt the data stored in the computing device by using the first set of keys, and then encrypt and store the data by using the second of keys.

Enterprise server 302 may replace at least one of the predefined encryption or decryption algorithm from the first set of predefined encryption or decryption algorithms at any instant of time and notifies about the change in the predefined encryption or decryption algorithms to the enterprise application. Enterprise server 302 provides both the first set of predefined encryption or decryption algorithms and the second set of predefined encryption or decryption algorithms to the enterprise application to enable the enterprise application to decrypt the data stored in first computing device 304a by using the first set of predefined encryption or decryption algorithms and then encrypt and store the data by using the second set of predefined encryption or decryption algorithms.

Enterprise server 302 is configured to handle various scenarios, wherein the invention is not intended to be limited to scenarios described below.

Scenario 1

In accordance with various embodiments, enterprise server 302 is configured to allow the user to register with the enterprise server using multiple computing devices (304a-304n). In such a case, enterprise server 302 allows the user to download the enterprise application in multiple computing devices (304a-304n) and assigns unique client ID for each enterprise application that is downloaded in multiple computing devices (304a-304n). Enterprise server 302 is configured to provide first set of keys and first set of encryption or decryption algorithms to the multiple computing devices (304a-304n) or different sets of keys and sets of encryption or decryption algorithms for data encryption or decryption.

Scenario 2

In accordance with various embodiments, the user may notify enterprise server 302 that a second computing device 304b would be utilized for accessing the enterprise application in place of first computing device 304a. In such a scenario, enterprise server 302 is configured to back up the data that is stored in first computing device 304a and synchronize the second computing device 304b with the backup data when the user notifies enterprise server 302 that second computing device 304b would be utilized in place of the first computing device 304a henceforth for accessing the enterprise application. Enterprise server 302 further blocks the enterprise application that is downloaded in first computing device 304a and issues a new client ID, a new set of keys for encryption or decryption and a new set of predefined encryption or decryption algorithms for the enterprise application that is downloaded in second computing device 304b.

Scenario 3

In accordance with various embodiments, enterprise server 302 allows the user to download a new version of the enterprise application in first computing device 304a. In such a scenario, enterprise server 302 is configured to back up the data stored in first computing device 304a and retains the backup data in first computing device 304a when first computing device 304a completes downloading the new version of the enterprise application. Enterprise server 302 may also avoid retaining the backup data in the first computing device 304a on completion of downloading the new version of the enterprise application in first computing device 304a. However, it should be noted that in both the cases, enterprise server 302 may choose to utilize the first set of keys for encryption or decryption before and after the downloading of the new version of the enterprise application or issue a different set of keys after downloading of the new version of the enterprise application for data encryption or decryption.

Scenario 4

In accordance with various embodiments, enterprise server 302 may handle scenario such as stolen computing device or incorrect entry of user authentication credentials for several attempts by blocking first computing device 304a from accessing the enterprise application and deleting the data stored in first computing device 304a on a first access when (i) the user reports that first computing device 304a is stolen or (ii) upon incorrect entry of user authentication credentials for several attempts. Enterprise server 302 also applies camouflage techniques to the data stored in first computing device 304a and provides incorrect data when an intruder decrypts the data stored in first computing device 304a.

Scenario 5

In accordance with various embodiments, enterprise server 302 allows multiple users to access the enterprise application by utilizing first computing device 304a. In such a scenario, enterprise server 302 assigns only one client ID to the enterprise application downloaded in first computing device 304a, wherein the client ID is associated with multiple user IDs. The enterprise application assigns different locations for storing the encrypted data for individual users in first computing device 304a and the location information is shared with the corresponding users upon successful authentication of the user with enterprise server 302.

Exemplary Computing Environment

Figure 4:
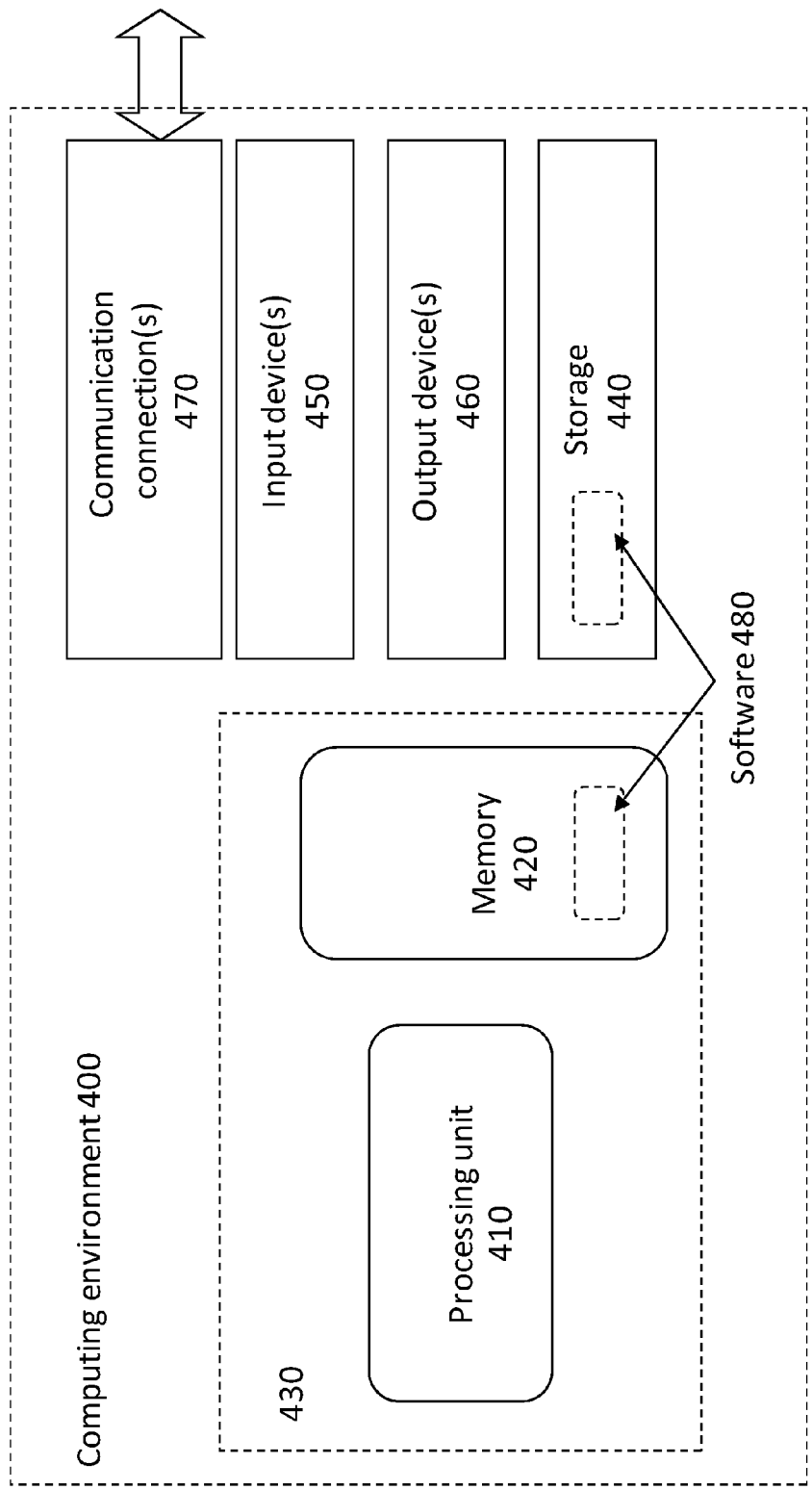
FIG. 4 illustrates a generalized example of a computing environment 400.

One or more of the above-described techniques can be implemented in or involve one or more computer systems. FIG. 4 illustrates a generalized example of a computing environment 400. The computing environment 400 is not intended to suggest any limitation as to scope of use or functionality of described embodiments.

With reference to FIG. 4, the computing environment 400 includes at least one processing unit 410 and memory 420. In FIG. 4, this most basic configuration 430 is included within a dashed line. The processing unit 410 executes computer-executable instructions and may be a real or a virtual processor. In a multi-processing system, multiple processing units execute computer-executable instructions to increase processing power. The memory 420 may be volatile memory (e.g., registers, cache, RAM), non-volatile memory (e.g., ROM, EEPROM, flash memory, etc.), or some combination of the two. In some embodiments, the memory 420 stores software 480 implementing described techniques.

A computing environment may have additional features. For example, the computing environment 400 includes storage 440, one or more input devices 450, one or more output devices 460, and one or more communication connections 470. An interconnection mechanism (not shown) such as a bus, controller, or network interconnects the components of the computing environment 400. Typically, operating system software (not shown) provides an operating environment for other software executing in the computing environment 400, and coordinates activities of the components of the computing environment 400.

The storage 440 may be removable or non-removable, and includes magnetic disks, magnetic tapes or cassettes, CD-ROMs, CD-RWs, DVDs, or any other medium which can be used to store information and which can be accessed within the computing environment 400. In some embodiments, the storage 440 stores instructions for the software 480.

The input device(s) 450 may be a touch input device such as a keyboard, mouse, pen, trackball, touch screen, or game controller, a voice input device, a scanning device, a digital camera, or another device that provides input to the computing environment 400. The output device(s) 460 may be a display, printer, speaker, or another device that provides output from the computing environment 400.

The communication connection(s) 470 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 400, computer-readable media include memory 420, storage 440, communication media, and combinations of any of the above.

Non-Transitory Computer-Readable Media

Any of the computer-readable media herein can be non-transitory (e.g., volatile or non-volatile memory, magnetic storage, optical storage, or the like).

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, magnetic storage, optical storage, or the like). Such instructions can cause a computer to perform the method.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The foregoing description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A method for secure data management, comprising:
   i. enabling, by an enterprise server, a user to download an enterprise application from the enterprise server using a computing device;
   ii. providing, by the enterprise server, user authentication credentials when the user registers with the enterprise server;
   iii. assigning, by the enterprise server, a unique client ID for the enterprise application downloaded by the computing device from the enterprise server;
   iv. generating keys for data encryption or decryption, by the enterprise server, for different services provided by the enterprise server based on the unique client ID, a user ID and/or a computing device ID;
   v. providing, by the enterprise server, a list of services to the computing device;
   vi. providing, by the enterprise server, a first set of keys for data encryption or decryption and information pertaining to a first set of predefined encryption or decryption algorithms corresponding to the list of services to the computing device;
   vii. launching, by the computing device, the enterprise application that is downloaded;
   viii. retrieving the first set of keys for data encryption or decryption and the information pertaining to the first set of predefined encryption or decryption algorithms from the enterprise server;
   ix. selecting, by the computing device, an appropriate service from the list of the services provided by the enterprise server upon successful authentication of the user by the enterprise server; and
   x. encrypting and/or decrypting data in the computing device by using at least one key from among the first set of keys corresponding to the service selected by the user;
   wherein the steps vii-x are performed by the computing device every time the enterprise application is launched.

2. The method according to claim 1, further comprising enabling the computing device to encrypt or decrypt data in the computing device by using at least one predefined encryption or decryption algorithm from among the first set of predefined encryption or decryption algorithm corresponding to the service selected by the user.

3. The method according to claim 2, wherein the data is already stored in the computing device.

4. The method according to claim 1, further comprising enabling the enterprise server to enable the user to download the enterprise application from the enterprise server in multiple computing devices.

5. The method according to claim 1, further comprising enabling the enterprise application to delete information pertaining to the keys and the predefined encryption or decryption algorithms, provided by the enterprise server when the computing device exits the enterprise application.

6. The method according to claim 1, further comprising enabling the enterprise server to share same key for different services provided by the enterprise server.

7. The method according to claim 1, further comprising enabling the enterprise server to share different keys for different services provided by the enterprise server.

8. The method according to claim 1, further comprising enabling the enterprise server to utilize same predefined encryption or decryption algorithm for different services provided by the enterprise server.

9. The method according to claim 1, further comprising enabling the enterprise server to utilize different predefined encryption or decryption algorithms for different services provided by the enterprise server.

10. The method according to claim 1, further comprising enabling the enterprise server to replace at least one key from among the first set of keys with at least one key from among a second set of keys at any instant and notify the enterprise application about change in the keys.

11. The method according to claim 10, further comprising enabling the enterprise server to provide both the at least one key from among the first set of keys and the at least one key from among the second set of keys to the enterprise application.

12. The method according to claim 10, further comprising enabling the enterprise application to encrypt or decrypt the data in the computing device by using the at least one key from among the second set of keys.

13. The method according to claim 1, further comprising enabling the enterprise server to replace at least one predefined encryption or decryption algorithm from among the first set of predefined encryption or decryption algorithms with at least one predefined encryption or decryption algorithm from a second set of predefined encryption or decryption algorithms at any instant and notify the enterprise application about the change in the predefined encryption or decryption algorithm.

14. The method according to claim 13, further comprising enabling the enterprise server to provide both the at least one predefined encryption or decryption algorithm from among the first set of predefined encryption or decryption algorithm and the at least one predefined encryption or decryption algorithm from among the second set of predefined encryption or decryption algorithm to the enterprise application.

15. The method according to claim 13, further comprising enabling the enterprise application to encrypt or decrypt the data in the computing device by using the at least one predefined encryption or decryption algorithm from among the second set of predefined encryption or decryption algorithm.

16. The method according to claim 1, further comprising enabling the enterprise server to
   a. backup data that is stored on a first computing device and synchronize a second computing device with the backup data; and
   b. block the enterprise application that is downloaded in the first computing device;
   when the user notifies the enterprise server that the second computing device would be utilized henceforth for accessing the enterprise application.

17. The method according to claim 1, further comprising enabling the enterprise server to perform one selected from the group consisting of:
   a. backup the data stored in the computing device and retain the backup data in the computing device; and
   b. avoid retaining the data stored in the computing device;
   when the user downloads a new version of the enterprise application using the computing device.

18. The method according to claim 1, further comprising enabling the enterprise server to block the computing device from accessing the enterprise application when a predefined condition occurs.

19. The method according to claim 18, wherein the predefined condition comprises a user reporting that the computing device is stolen and an incorrect entry of user authentication credentials after several attempts.

20. A framework for secure data management, comprising:
   a. an enterprise server configured to
      I. enable a user to download an enterprise application from the enterprise server using a computing device;
      II. provide user authentication credentials when a user registers with the enterprise server;
      III. assign a unique client ID for the enterprise application, that is downloaded by the computing device from the enterprise server; and
      IV. generate keys for data encryption or decryption for different services provided by the enterprise server based on the unique client ID, an ID of the user and/or a computing device ID;
      V. provide a list of services to the computing device; and
      VI. provide a first set of keys for data encryption or decryption and information pertaining to a first set of predefined encryption or decryption algorithms corresponding to the list of services to the computing device; and
   b. the computing device configured to launch the enterprise application that is downloaded;
      ii. retrieve the first set of keys for data encryption or decryption and the information pertaining to the first set of predefined encryption or decryption algorithms from the enterprise server;
      iii. enable the user to select an appropriate service from the list of services provided by the enterprise server upon successful authentication of the user by the enterprise server; and
      iv. encrypt and/or decrypt data in the computing device by using at least one key from among the first set of keys corresponding to the service selected by the user;
      wherein the computing device is configured to perform the steps i-iv every time the enterprise application is launched.

21. The framework according to claim 20, wherein the computing device is configured to encrypt and/or decrypt the data in the computing device by using at least one predefined encryption or decryption algorithm from among the first set of predefined encryption or decryption algorithm corresponding to the service selected by the user.

22. The framework according to claim 20, wherein the data is already stored in the computing device.

23. The framework according to claim 20, wherein the enterprise server is further configured to enable the user to download the enterprise application from the enterprise server in multiple computing devices.

24. The framework according to claim 20, wherein the enterprise application is configured to delete the information pertaining to the keys and the predefined encryption or decryption algorithms, provided by the enterprise server, when the computing device exits the enterprise application.

25. The framework according to claim 20, wherein the enterprise server shares the same key for different services provided by the enterprise server.

26. The framework according to claim 20, wherein the enterprise server shares different keys for the different services provided by the enterprise server.

27. The framework according to claim 20, wherein the enterprise server provides the same predefined encryption or decryption algorithm for the different services provided by the enterprise server.

28. The framework according to claim 20, wherein the enterprise server provides different predefined encryption or decryption algorithms for the different services provided by the enterprise server.

29. The framework according to claim 20, wherein the enterprise server is configured to replace at least one key from among the first set of keys with at least one key from among a second set of keys at any instant and notify the enterprise application about change in the keys.

30. The framework according to claim 29, wherein the enterprise server is configured to provide both the at least one key from among the first set of keys and the at least one key from among the second set of keys to the enterprise application.

31. The framework according to claim 29, wherein the enterprise application is configured to encrypt or decrypt the data in the computing by using the at least one key from among the second set of keys.

32. The framework according to claim 20, wherein the enterprise server is configured to replace at least one predefined encryption or decryption algorithm from among the first set of predefined encryption or decryption algorithms with at least one predefined encryption or decryption algorithm from a second set of predefined encryption or decryption algorithms at any instant and notify the enterprise application about the change in the predefined encryption or decryption algorithm.

33. The framework according to claim 32, wherein the enterprise server is configured to provide both the at least one predefined encryption or decryption algorithm from among the first set of predefined encryption or decryption algorithm and the at least one predefined encryption or decryption algorithm from among the second set of predefined encryption or decryption algorithm to the enterprise application.

34. The framework according to claim 32, wherein the enterprise application is configured to encrypt or decrypt the data in the computing device by using the at least one predefined encryption or decryption algorithm from among the second set of predefined encryption or decryption algorithm.

35. The framework according to claim 20, wherein the enterprise server is further configured to
a. backup data that is stored on a first computing device and synchronize a second computing device with the backup data; and
b. block the enterprise application that is downloaded in the first computing device, when the user notifies the enterprise server that the second computing device would be utilized henceforth for accessing the enterprise application.

36. The framework according to claim 20, wherein the enterprise server is further configured to perform one of:
a. backup the data stored in the computing device and retain the backup data in the computing device; and
b. avoid retaining the data stored in the computing device when the computing device downloads a new version of the enterprise application.

37. The framework according to claim 20, wherein the enterprise server is further configured to block the computing device from accessing the enterprise application when a predefined condition occurs.

38. The framework according to claim 37, wherein the predefined condition comprises a user reporting that the computing device is stolen and an incorrect entry of user authentication credentials after several attempts.

39. A non-transitory computer program product for use with a computer, the computer program product comprising a computer usable medium having a computer readable program code embodied therein for secure data management, the computer readable program code storing a set of instructions configured for:
a. enabling, by an enterprise server, a user to download an enterprise application from the enterprise server using a computing device;
b. providing, by the enterprise server, user authentication credentials when a user registers with the enterprise server;
c. assigning, by the enterprise server, a unique client ID for an enterprise application downloaded by the computing device from the enterprise server;
d. generating keys for data encryption or decryption, by the enterprise server, for different services provided by the enterprise server based on the unique client ID, a user ID and/or a computing device ID;
e. providing, by the enterprise server, a list of services to the computing device;
f. providing, by the enterprise server, a first set of keys for data encryption or decryption and information pertaining to a first set of predefined encryption or decryption algorithms corresponding to the list of services to the computing device;
g. launching, by the computing device, the enterprise application that is downloaded;
h. retrieving the first set of keys for data encryption or decryption and the information pertaining to the first set of predefined encryption or decryption algorithms from the enterprise server;
i. selecting, by the computing device, an appropriate service from the list of the services provided by the enterprise server upon successful authentication of the user by the enterprise server; and
j. encrypting and/or decrypting data in the computing device by using at least one key from among the first set of keys corresponding to the service selected by the user; wherein the steps g-j are performed by the computer readable program code, every time the enterprise application is launched by the computing device.

* * * * *

UNITED STATES PATENT AND TRADEMARK OFFICE
CERTIFICATE OF CORRECTION

Page 1 of 1

PATENT NO.        : 8,412,955 B1
APPLICATION NO.   : 13/327547
DATED             : April 2, 2013
INVENTOR(S)       : Gupta et al.

It is certified that error appears in the above-identified patent and that said Letters Patent is hereby corrected as shown below:

In the Claims:

Column 10, line 40 (Claim 20), "b. the computing device configured to launch the enterprise application that is downloaded;" should read --b. the computing device configured to i.  launch the enterprise application that is downloaded;--

Signed and Sealed this
Thirteenth Day of October, 2015

Michelle K. Lee
*Director of the United States Patent and Trademark Office*